ns
3,220,962
GEL SEALANT FOR PATENT LEATHER
Paul C. Cassidy, Lowell, and Mario Giella, Boston, Mass., assignors to Swift & Company, Chicago, Ill., a corporation of Illinois
No Drawing. Filed Oct. 26, 1960, Ser. No. 65,011
6 Claims. (Cl. 260—18)

This invention relates to a homogenized gel dispersion and a method for preparing a homogenized gel dispersion containing the reaction product of a modified polymeric polyamide and an epoxy resinous material.

It is an object of this invention to provide a reaction product of a modified polymeric polyamide and an epoxy resinous material in the form of a homogenized gel dispersion.

A further object of the invention is the provision of a method for the controlled reaction between a modified polyamide and an epoxy resinous material, the control insuring that the reaction product does not set up to a solid mass, but is produced in the form of a gel dispersion.

A further object is the provision of a homogenized gel dispersion adapted for use as a daub coat in the treatment of leather products.

Additional objects if not specifically set forth herein will be readily apparent to those skilled in the art from the detailed description which follows.

In copending application Serial No. 47,150, and now U.S. Patent No. 3,130,069, filed August 3, 1960, wherein the present inventors are co-inventors with Malcolm H. Battles and Joseph A. Bassett, there are disclosed compositions which provide among other desirable characteristics a unique adaptability to the top coating of leather. The compositions are the reaction products of modified polyamide resins and complex epoxides. Generally, in using these compositions in coating objects, a film or coating of the composition is applied from a solvent or other liquid carrier and after removal of the liquid carrier the coating composition is then subjected to curing conditions to cause the coating to set to a hard finish.

In those cases where it is not desirable to cure the coating after application to the object it is necessary that the coating be cross-linked to the insoluble infusible form before application to the object. Cross-linking prior to application presents problems, however, inasmuch as the compound does not flow and cannot readily be spread on the surface of the object being coated.

Accordingly, one of the principal advantages of the homogenized gel dispersions of this invention is that the cross-linked composition can be easily applied to the object to be coated and distribution of the composition on the object is easily attained.

A simplified flow diagram of the method is as follows:

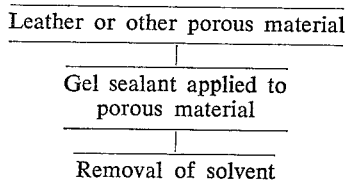

Further, while the compositions of the aforementioned copending application are not completely reacted, that is, cross-linking is not completed, until after they are applied to the surface being treated and cured by the application of heat or other curing means, the homogenized gel dispersion of the present invention comprises a composition in which all reaction between the component parts thereof has been completed prior to application of the composition to the material being treated.

Generally, the invention is concerned with the production of a colloidal dispersion comprising the reaction product of an epoxy resinous material containing terminal epoxy groups and a modified polyamide resin, said polyamide being the reaction product of polymeric fat acids having at least two carboxyl groups and alkylene polyamines, said polyamide being modified by reaction with an aliphatic monoepoxide having about 4–18 carbon atoms and preferably 6–8 carbon atoms. The homogenized gel dispersion is prepared in accordance with a method comprising a unique combination of preparative steps. The gel dispersion has been found to be of significant value in the treatment of certain materials such as leather in the application of a sealer or daub coat to the leather during the processing thereof.

The homogenized gel dispersion may be prepared by reacting a polyamide reaction product of polymeric fat acids of 10–22 carbons, and an aliphatic polyamine, with a short chain $C_6$–$C_8$ aliphatic mono oxirane containing composition and further reacting this product with a complex diepoxide resin under conditions which insure that the reaction product does not set up in a mass. Avoidance of a plastic mass in the reaction product is best achieved by vigorous agitation during reaction of the polyamide and epoxy containing material, and the generous use of liquid carrier during the manufacture of the product. The homogenized gel which is produced exhibits very desirable properties when applied as a daub coat in sealing leather, paper and other cellulosic and fibrous materials where high adhesion, good sealing, high extensibility and resistance against change on heat aging are desired. Also the daub is quick setting, can be top coated with other resinous and non-resinous coating materials, and requires no cure.

More specifically, the invention comprises reacting the polyamide with the monoepoxide in a solvent medium until substantially all of the monoepoxide reacts with and blocks the calculated number of free amine groups on the polyamide. This reaction is carried out under conditions of vigorous agitation, and this vigorous agitation is continued during the addition of a complex resinous epoxide. After a short period of reaction time has elapsed, but before a gel is formed, the stirring is discontinued. The reaction is then allowed to continue without agitation until the reaction mixture has become a soft gel. The formation of a soft gel is easily determined empirically by noting whether the surface of the mixture snaps back when touched with a glass rod and lifted.

At this point the gel is further diluted with solvent and vigorous agitation is employed to disperse the gel and reduce the solids content of the mixture from about 42% to about 13%. The solids reduction can vary from around 40–50% solids diluted to about 10–15% solids. After this dilution, the reaction is continued for approximately an additional 16 hours until a soft gel again forms. The gel is then dispersed in a solvent which in addition to being a solvent also stops the reaction. The reaction product in the solvent is homogenized, and if a pigment or other inert material is used, it may be added at this point. The gel is further homogenized and then filtered through a screen (100 mesh) to remove large particles therefrom. The product can then be applied to the surface being treated by spraying, flow coating or other means well known to those skilled in the art.

Because of the very small particle size of the particulate product, the particles enter the porous surface and form a continuous film on the surface. The solvent carrier is removed from the surface by evaporation. The daub coat thus formed is quick setting, requires no cure, and can be topcoated within minutes since it does not dissolve in organic solvents used to apply the topcoat. Also the daub coat gives excellent sealing in only one application and exhibits high extensibility and good cold properties.

In the preparation of the homogenized gel dispersion, polyamides of the type described in Cowan et al. Patent No. 2,450,940 are first reacted with an aliphatic short chain monoepoxide. The polyamides are prepared by the reaction between lower aliphatic polyamines such as diethylene triamine, triethylene tetramine, tetraethylene pentamine, 3,3'-imino-bis-propylamine and related polyalkylene polyamines with polymeric fat acids resulting from the polymerization of drying or semi-drying oils, or from the free polyene fatty acids of 10–22 carbons, or simple alcohol esters thereof. Polymeric fat acids which are employed in preparing the polyamide include the polymerized mixture of acids derived from such naturally occurring materials as peanut oil, cottonseed oil, soybean oil, corn oil, linseed oil, sunflower seed oil, tung oil, tall oil, etc. These polyamides are low melting resins having melting points in the range 29–95° C. and generally these materials are liquids or semisolids at room temperature and have an amine number of around 80–320. The amine number is defined as the number of milligrams of potassium hydroxide equivalent to the free amine groups present in one gram of the resin. The amine number gives a measure of the amount of free amine groups present in the polyamide. Those polyamides known as Versamids of the 100 series, including Versamid 100, Versamid 115 and Versamid 125, and which are commercially available, are particularly desirable as the polyamide reactant.

Suitable monoepoxides employed in blocking the polyamide include the lower oxirane containing aliphatic hydrocarbons, fatty acids, alcohols, esters, ethers, or other aliphatic monoepoxy derivatives having 4–18 carbons, and being free of interfering substituents. Non-resinous monoepoxides such as octylene oxide (2,3-epoxy octane) and aliphatic oxirane containing ethers such as butyl glycidyl ether, amyl glycidyl ether, and hexyl glycidyl ether are particularly desirable. Other suitable monoepoxides are described in the aforementioned copending application Serial No. 47,150, and now U.S. Patent No. 3,130,869, filed August 3, 1960, the disclosure of which is incorporated herein by reference.

The amount of blocking is dependent upon the amount of blocking agent employed to react with the free amino hydrogens of the polyamide. A very desirable intermediate product is formed by blocking the polyamide about 30–50% with the monoepoxide, although preferably blocking should be around 35–45%. The amount of blocking is calculated from the following equation:

$$\frac{\text{Grams polyamide resin} \times F \times \text{molecular weight epoxide} \times \text{percent blocking desired}}{\text{Acid equivalent weight of polyamide obtained by titration}} = \text{Grams monoepoxide}$$

F is a factor derived from the ratio of the number of primary and secondary amino groups present in the polyamide.

$$F = \frac{2 \text{ (primary amino groups)} + \text{(secondary amino groups)}}{\text{(primary amino groups)} + \text{(secondary amino groups)}}$$

The number of primary amino groups can be determined by reacting the polyamide with benzaldehyde and measuring the amount of water formed. Primary plus secondary amino groups can be determined by acid titration, and secondary amino groups by difference. Other methods known in the art for determining primary and secondary amino groups can be employed in calculating the amount of blocking agent to be used.

The blocking reaction is carried out in a solvent medium at a temperature sufficient to substantially react the amino and oxirane groups. Ordinarily, a time and temperature relationship equivalent to a reaction carried out at about 120° C. for 4 hours should be provided.

The reaction temperature is not critical and the usual time-temperature function applies. At lower temperatures the reaction must be carried out for longer periods of time than is the case when higher temperatures are employed. Generally it is convenient to conduct the reaction at the temperature at which the monepoxide refluxes, or where low boiling organic solvents are employed, at the reflux temperature of the solvent. It is preferred that the reaction be carried out at a temperature in excess of about 80–90° C. to insure completion of the reaction in a reasonable period of time. Extremely high temperatures bordering on pyrolysis of the reactants or the reaction product are, of course, to be avoided.

At the completion of the blocking reaction, the reaction product is heated and mixed with a polyepoxide in a solvent medium for a short period of time. The polyepoxide can be any of those polyepoxides set forth in the copending application noted above. The complex epoxide is a polymeric reaction product obtained by reacting polyhydric phenols with polyfunctional halohydrins. These polymers contain an average of about two terminal epoxy groups per molecule and are produced by reacting 1–5 moles of bisphenol with 2–6 moles epichlorohydrin. One method for producing these compositions is set forth in Greenlee Patent No. 2,585,115. The complex epoxide material is usually added in a solvent such as methyl isobutyl ketone, and the reactants are agitated vigorously for about 30–90 minutes. When an increase in viscosity of the mixture is noted, the stirrer is stopped and a soft gel allowed to form. This can be determined empirically by touching the surface of the mix with a glass rod and lifting. If the reaction mixture snaps back when the rod is lifted, the degree of gelation has proceeded to the point where further dilution is necessary.

At this point, the gel is diluted by adding appreciable amounts of liquid such as xylene or toluene while stirring is resumed, thus reducing the solids content of the mixture from about 40% to about 13% and dispersing the gel. The very dilute reaction mixture is then allowed to sit until a soft gel is again formed. The formation of a soft gel at this stage of the process usually requires several hours.

The liquid carrier employed to dilute the reaction mixture and insure that the blocking reaction and the reaction with complex epoxide proceed in a very dilute medium may be any of a number of organic solvents. Medium and high boiling organic solvents including aromatic hydrocarbons and halogenated aliphatic hydrocarbons may be employed for this purpose. Also, mixtures of such carriers with each other and with other solvents may be employed. Benzenoid solvents such as benzene, lower alkyl substituted benzenes such as the xylenes and toluene are very suitable solvents as are the halogenated lower aliphatic hydrocarbons such as trichloroethylene, 1-chloro-1-nitropropane and perchloroethylene. Oxygen containing heterocyclic hydrocarbons such as tetrahydrofuran may also be employed. The solvent used as a carrier during the reactions should be free of substituents which react with epoxy groups and should have a boiling point above about 50° C. to permit the reaction to proceed at a reasonable temperature without volatilizing substantial quantities of the solvent. Similarly, the boiling point of the solvents should not be so high as to render removal of the solvent difficult when the product is applied to a surface. It is advisable that solvents having a boiling point at atmospheric pressure less than about 200° C. be employed. While these organic liquids in some instances appear to be true solvents for the reaction products, it appears that they also may provide homogeneous dispersions of the reactants and the reaction products.

When the soft gel is formed, a solvent containing hydroxyl groups is added, and the mixture is permitted to stand overnight to permit the particles to swell. The hydroxyl groups in the solvent aid in terminating the reaction and also in dispersing the reaction product.

The liquid employed to further disperse the coating material serves the dual purpose of acting as a diluent and terminating the cross-linking reaction which has been proceeding between the blocked polyamide and the complex epoxide. Hydroxyl substituted aliphatic hydrocarbons such as monohydric and dihydric alcohols are particularly suitable for this purpose since the hydroxyl group of such compositions combines with available epoxide groups in the reaction product, stopping any further cross-linking. Aliphatic alcohols such as isopropanol, n-butanol, isobutanol, methyl isobutyl carbinol, 2-nitro-1-butanol, and the monalkyl ethers of ethylene glycol may also be employed. Relatively nonvolatile alcohols such as ethylene glycol and alcohols boiling above about 200° C. at atmospheric pressure are not particularly desirable in the formation of the gel although such liquids serve to provide reactive groups which terminate the cross-linking reaction. The low vapor pressure of such materials renders removal thereof from coated surfaces difficult. Also, those alcohols which are very volatile while operable are not the most desirable.

Generally, the epoxide reactive solvent which serves as a diluent and terminates the reaction should be an aliphatic alcohol which has a boiling point in the range of about 75–200° C. and which is compatible with the solvents employed in the reaction mixture. As is the case with the application of any solution to a surface where penetration of the solute is desired, the solvent balance must be controlled to avoid incompatible systems and also provide systems which adequately wet the surface.

Color may then be added and after homogenization of the alcohol containing dispersed gel reaction product the material is filtered to remove any large particles. The gel dispersion will pass a 100 mesh screen and accordingly it is possible to remove larger particles by passing the dispersion through a 100 mesh screen. This dispersion is suitable for application to crust leather by spray coating or flow coating.

The following example shows the preparation of the homogenized gel dispersion.

*Example I*

In a reaction vessel fitted with a variable speed stirrer, reflux condenser, and external heat source, a 3860 gram solution of 60% Versamid 100 nonvolatiles in toluene is heated to 120° C. 152 grams of octylene oxide is added to the stirred mass and the temperature is kept at 120° C. for 4 hours. At the end of 4 hours a solution of 709 grams of Araldite 502 liquid epoxy resin and 621 grams methyl isobutyl ketone is added. The temperature is adjusted to 110° C. and stirring is continued for 45 minutes after the addition. The stirring is discontinued and the incipient gel is allowed to harden for about 14 minutes, or to the point where it will spring back when picked up on a glass rod. A solution of 10,210 grams xylene, 4,940 grams toluene, and 495 grams Cellosolve is rapidly added and the high speed stirrer is turned on for about 5 minutes, or until a clear solution, free of large suspended particles, is formed. The stirring is discontinued and a homogeneous weak gel is allowed to reform. After no more than 24 hours the gel is broken up with the high speed stirrer and 825 grams more Cellosolve is added. This gel may be further dispersed in a Waring Blendor for 1 minute, or any other device which reduces particle size, to form a homogenized suspension of gel particles, then filtered for use.

During the course of the reactions disclosed, the reaction temperature influences the rate of formation of the gel, and the reaction can be speeded up by employing higher reaction temperatures. Generally, the monoepoxide blocked polyamide should be reacted with the complex epoxide at a temperature in the range 80–120° C. to insure a reaction time less than about 2 hours and preferably around ½ hour to 1 hour.

The initial gel time is not significantly affected by the amount of cross-linking inasmuch as a blocked polyamide which is cross-linked only 30% exhibits and initial gel time of around 70 minutes, the same blocked polyamide cross-linked as much as 85% with a greater amount of diepoxide shows an initial gel time of about 50 minutes.

While the invention is directed to the production of a homogenized gel and the process for preparing this homogenized gel, it should be realized that control of the reaction to insure slow formation of the reaction product in a large quantity of solvent or other liquid carrier is an important consideration. Controlling the reaction in a large amount of liquid carrier insures that no large and/or hard particles of the reaction product are formed.

Obviously many modifications and variations of the invention as hereinbefore set forth may be made without departing from the spirit and scope thereof and accordingly only those limitations are to be imposed as are indicated in the appended claims.

We claim:

1. A method for coating leather with a daub coat having superior flexural and low temperature flexibility comprising: contacting and distributing over the surface of crust leather a thixotropic gel containing as the dispersed phase the cross-linked reaction product of a complex liquid polymeric reaction product of polyhydric phenol and polyfunctional halohydrin having an average of about 2 terminal epoxy groups per molecule and a modified polyamide reaction product of polymeric fat acids of 10–22 carbons having at least 2 carboxyl groups and alkylene polyamines, said polyamide being modified by reaction with an aliphatic monoepoxide having about 4–18 carbon atoms in an organic solvent, the amount of said monoepoxide being sufficient to block about 30–50% of the reactive amino groups in the said polyamide, forming a continuous film of said reaction product on said surface and removing the solvent from said surface.

2. A method for preparing a gel sealer having desirable sealing properties, good flexibility and resistance to solvents comprising bringing together and reacting a polyamide of polymeric fat acids of 10–22 carbons and aliphatic polyamine having an amine number of 80–320 with an aliphatic monoepoxide having 4–18 carbons in an organic liquid carrier, the amount of said monepoxide being sufficient to block about 30–50% of the reactive amino groups in the said polyamide, whereby the monoepoxide reacts with the free amino groups of said polyamide and forms a modified polyamide; adding a complex epoxy resin reaction product of polyhydric phenol and polyfunctional halohydrin having an average of about 2 terminal epoxy groups per molecule to said modified polyamide and agitating the mixture thus formed vigorously until an incipient gel is formed; adding solvent to the gel and agitating the mixture vixgorously until the gel is broken up; further holding the mixture until a gel is again formed and adding an alcohol to the mix with agitation and recovering the homogenized reaction product.

3. A soft, jellylike product comprising: the cross-linked reaction product of a 30–50% blocked polyamide reaction product of polymeric fat acids of 10–22 carbons having at least 2 carboxyl groups and alkylene polyamines, said polyamide being modified by reaction with an aliphatic monoepoxide having about 4–18 carbon atoms and a complex epoxide reaction product of polyhydric phenol and polyfunctional halohydrin having an average of about 2 terminal epoxy groups per molecule in the form of fine particles as the dispersed phase and an organic solvent carrier as the continuous phase, said dispersed phase being present in an amount of about 10–15 percent of the total weight of said product.

4. A thixotropic gel comprising: the cross-linked reaction product obtaine by reacting a 30–50% blocked polyamide reaction product of polymeric fat acids of 10–22 carbons having at least 2 carboxyl groups and alkylene polyamines, said polyamide being blocked by reaction with an aliphatic monoepoxide having about 4–18 carbon atoms and a complex epoxide reaction product of polyhydric phenol and polyfunctional halohydrin having an average of about 2 terminal epoxy groups per molecule in the form of small particles dispersed in an organic solvent, said solvent comprising a mixture of an aliphatic alcohol and a solvent selected from the group consisting of high boiling aromatic hydrocarbons and chlorinated aliphatic hydrocarbons.

5. A thixotropic vehicle adapted for coating objects which comprises: a particulate solid dispersed in an organic solvent, said particulate solid being present in an amount of about 10–15 percent based on the weight of said vehicle, said solid being the cross-linked reaction product of a complex epoxy resin reaction product of polyhydric phenol and polyfunctional halohydrin, said reaction product having an average of about 2 terminal epoxy groups per molecule and a blocked polyamide reaction product of polymeric fat acids of 10–22 carbons and alkylene polyamines, said polyamide being blocked by reaction with an aliphatic monoepoxide having about 4–18 carbon atoms, said organic solvent comprising a mixture of an aliphatic alcohol and a material selected from the group consisting of high boiling aromatic hydrocarbons and chlorinated aliphatic hydrocarbons.

6. A thixotropic composition comprising: about 10–15% of resin particles dispersed in an organic solvent, said resin particles being of 100 mesh size or less, said resin particles being composed of the cross-linked reaction product of a complex epoxy resin and a modified polyamide comprising a reaction product of polymeric fat acids of 10–22 carbons and alkylene polyamines, said polyamide being modified by reaction with an aliphatic monoepoxide having about 4–18 carbon atoms, the amount of said monoepoxide being sufficient to block about 30–50% of the reactive amino groups in the said polyamide, said organic solvent comprising a mixture of an aliphatic alcohol and a material selected from the group consisting of high-boiling aromatic hydrocarbons and chlorinated hydrocarbons.

References Cited by the Examiner

UNITED STATES PATENTS

| | | | |
|---|---|---|---|
| 2,872,427 | 2/1959 | Schroeder | 117—142 |
| 2,890,184 | 6/1959 | Foerster | 260—18 |
| 2,901,461 | 8/1959 | Auerbach et al. | 260—47 |
| 2,943,953 | 7/1960 | Daniel | 117—161 |
| 2,955,958 | 10/1960 | Brown | 117—113 |
| 3,130,069 | 4/1964 | Battles et al. | 260—18 |

FOREIGN PATENTS 776,375   6/1957   Great Britain.

LEON J. BERCOVITZ, *Primary Examiner.*

A. D. SULLIVAN, MILTON STERMAN, *Examiners.*